No. 21,540. PATENTED SEPT. 14, 1858.
A. SHERWOOD.
RAKING AND BINDING APPARATUS FOR HARVESTERS.
2 SHEETS—SHEET 2.
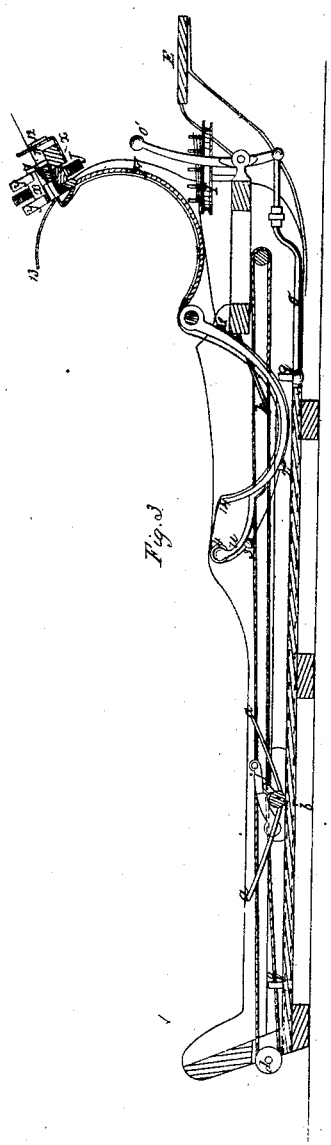
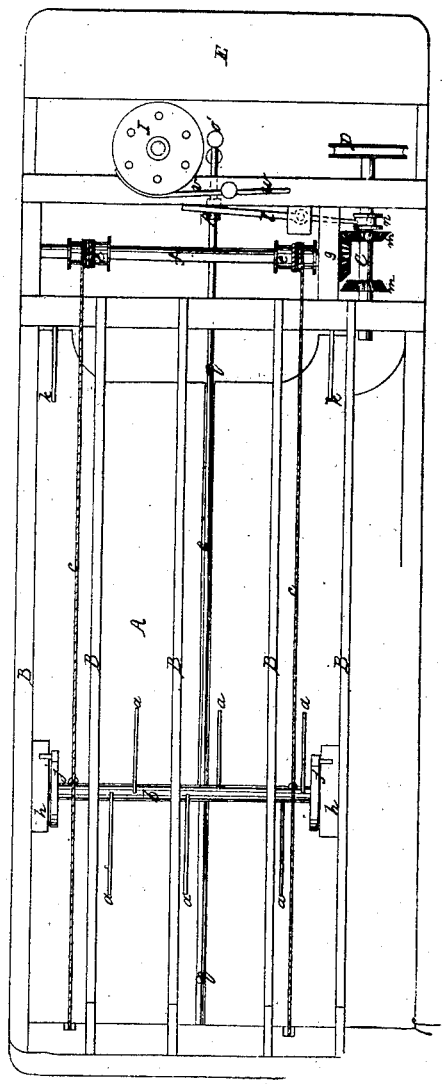

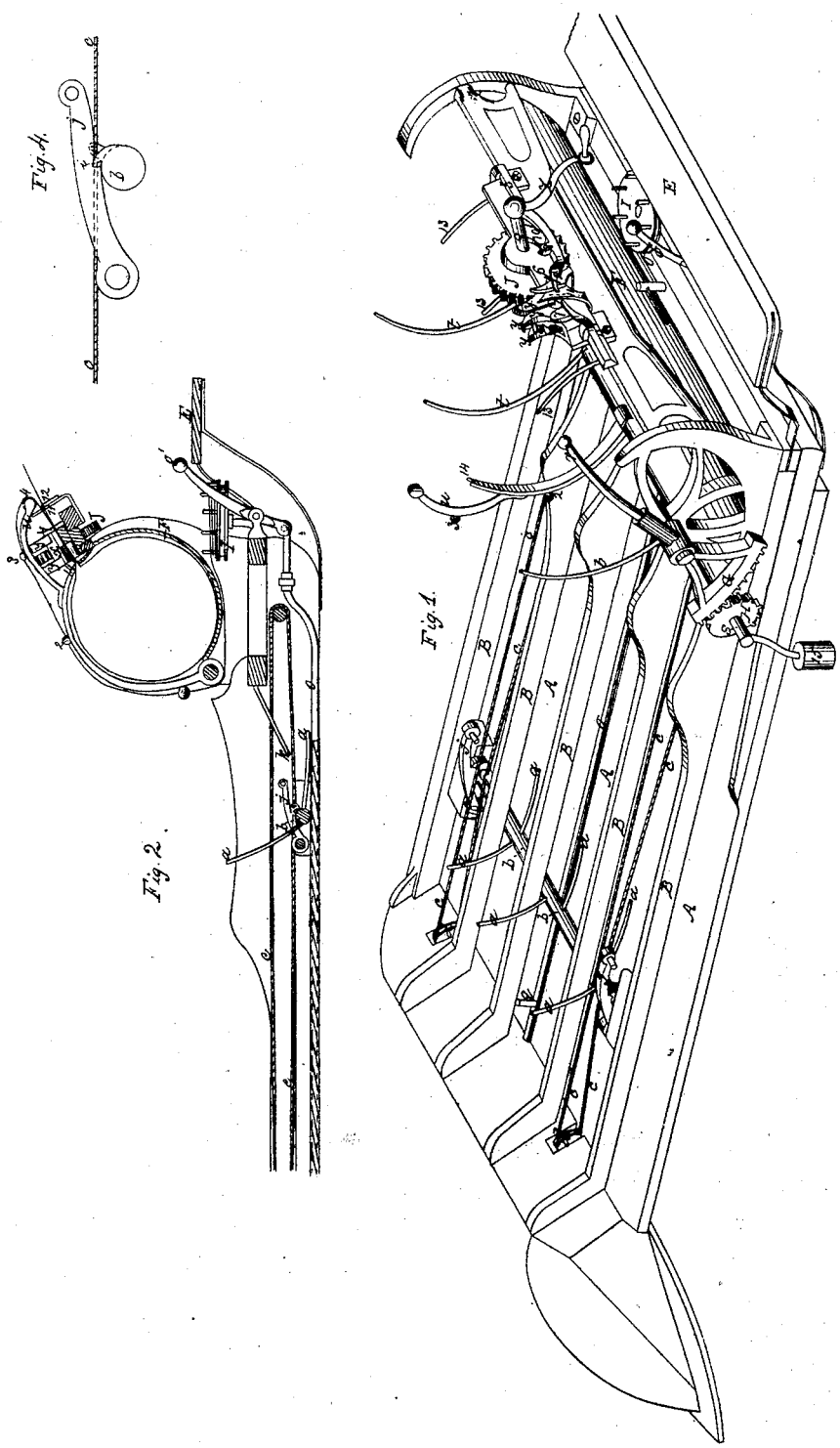

UNITED STATES PATENT OFFICE.

ALLEN SHERWOOD, OF AUBURN, NEW YORK, ASSIGNOR TO E. P. SENTER, ALBERT H. GOSS, AND DANIEL WOODWORTH.

IMPROVED RAKING AND BINDING APPARATUS FOR HARVESTERS.

Specification forming part of Letters Patent No. 21,540, dated September 14, 1858.

*To all whom it may concern:*

Be it known that I, ALLEN SHERWOOD, of Auburn, in the county of Cayuga and State of New York, have invented certain new and useful Improvements in the Raking and Binding Apparatus of Harvesters; and I do hereby declare the following to be a full, clear, and exact description of the construction and operation of the same, reference being had to the accompanying drawings, making a part of this specification, in which—

Figure 1 represents a perspective view of the raking and binding apparatus complete. Figs. 2 and 3 represent longitudinal sections through the same, showing the parts in different positions. Fig. 4 represents a detached portion of the raking apparatus, drawn on an enlarged scale. Fig. 5 represents a top plan of the platform and raking contrivance, the binding devices not being represented.

Similar letters of reference, where they occur in the several figures, denote like parts of the apparatus in all of them.

My invention relates to a raking and binding apparatus which may be connected to any grain-harvester, its object being to gather the grain into a gavel, bind it up into bundles, and deliver it thus bound up onto the ground, the operation being partly automatic and partly manual, though at all times under the control of the operator, who rides upon the machine; and the nature of my invention consists in the manner in which I have combined and arranged the several devices for effecting this object.

To enable others skilled in the art to make and use my invention, I will proceed to describe the same with reference to the drawings.

A represents a platform of a grain-harvester, provided with longitudinal ribs B B, &c., upon which the grain falls as it is cut, and between which the gathering-fingers $a$ of the traversing rake-head $b$ move. This rake-head $b$ is traversed back and forth by means of cords $c\ c$, having their two ends fastened to said rake-head, and passing over pulleys $d\ e$, the latter of which are on a shaft, $f$, that is rotated, first in one direction and then in a contrary one, by a shifting gear-wheel, $g$. At the ends of the rake-head $b$ there are guiding-blocks $h\ h$, which move against the outer ribs B, and keep it from binding or cramping, the intermediate ribs between the outer ones being raised up from the platform high enough to allow the rake-head to pass underneath them. There are teeth $i\ i$ near the ends of the rake-head, against which weighted pawl-levers $j\ j$ catch, to hold it from turning until at the proper time, and then these pawl-levers are raised up by inclined rods $k$, which take them and raise the pawl part out of the teeth.

The rake is operated as follows: On the end of a shaft, C, Fig. 5, there is a pulley-wheel, D, around which a belt coming from any of the rotating parts of the harvester may pass, to give said shaft motion; or gearing of any other kind may be used, if preferred. On this shaft C there are two bevel-gear wheels, $m\ m'$, with their teeth facing each other. There is also a clutch, $n$, on said shaft, into which a shipper, $l$, fits, so that this shaft may be shifted in the line of its length, and thus bring one or the other of its gear-wheels $m\ m'$ into gear with the bevel-gear $g$ between them, said gear $g$ being fastened to the end of the shaft $f$, heretofore described, that carries the pulleys $e\ e$, over which pass the cords $c$, that traverse the rake-head. The shipper is ordinarily operated by the rake-head, but may be used by the binder when for any purpose it becomes necessary to change the motion of the rake.

When the shipper is worked automatically, it is done as follows: A rod, $o$, is centrally placed along the platform, and is made fast at $p$ to the shipper. On this rod, at or near each end of the platform or traverse of the rake-head $b$, there are upright studs $q\ q'$, against which the rake-head strikes, and pushing said rod with it, it moves the shipper $l$, throwing out one gear and putting the pinion $g$ in mesh with the other gear, which reverses the motion of the rake. The operator can at any time, by moving the shipper, cause the rake to be reversed, and without disarranging its automatic movement afterward, for when he lets go the shipper the rake-head will operate it, as above described. $o'$ is a lever connected to the rod $o$, and so arranged as that the operator, from his seat E, may readily catch it, to operate the shipper. The rake-head $b$ must have a slight rocking or rolling motion in its blocks $h$, so that the fingers may be brought into action, or above the line of the ribs B, to gather and carry along the cut grain to the binding apparatus, and when it returns for the next charge the gathering-fingers must drop below said ribs; or one set of arms may drop down, while the others rise up, on the back motion, to sweep the platform in that direction, the return motion of the rake bringing the grain all back with it. This is effected by fastening the cords $c$ to a projecting stud or dead-eye on top of the rake-head, so that whenever either end of the cord is drawn upon it rocks the rake-head sufficient to throw the fingers into or out of action, as above set forth.

When the rake has gathered sufficient to form a gavel or bundle, it is thrown up into the concave F by the operator, who raises up the lever $r$, which causes a segment, G, to turn a pinion, H, on a shaft, $s$, said shaft carrying raising-fingers $t$ and guide-arm $u$, which carries and places the wire (with which the sheaf is to be bound) in the twisting-wheel that forms the tie, which contrivances will be now described.

I is a reel for carrying the wire that is used for binding, and $v$ a presser-spring to keep the reel from turning too freely.

$w$ is an arm against which the operator may place his foot to throw out the presser-spring $v$ when it is necessary to let the reel run free. The wire from the reel I, as shown in Figs. 2, 3, passes through guides 1 2 3 on the convex side of the arm $u$, and thence over a friction-pulley, 4, in the end of said arm $u$, and then laid slack along the concave side of said arm $u$ and receiver F, as distinctly shown in Fig. 3, where the several parts are in their proper positions for receiving the gavel that is afterward to be brought up and bound. The extreme end of the wire is laid in a slot cut in the twisting-wheel $x$, said slot extending to near the center of said wheel, and the end of the wire projects slightly in rear of said wheel, as shown in the drawings.

$y\,y$ are guides which stand on each side of the slot in the twisting-wheel, and are designed for the easy guiding of the wire into the slot.

J is a cogged wheel having a crank, $z$, attached to it, by which it is rotated by the operator on his seat E. This wheel J gears with the teeth or cogs on the twisting-wheel $x$, and operates said wheel $x$. There is a cutter-bar, 5, back of the frame 6, which supports the gearing, said bar having upon it a cutter, 7, and a stud, 8.

On the shaft 9 of the wheel J there is a cam, 10, which strikes against the stud 8, and drives the cutter-bar before it. This brings the cutter 7 against the wires after their ends have been twisted together, and cuts them off. The sheaf being thus bound up and the wire cut, it is thrown out of the receiver or concave by the operator, a hole being made in said concave to enable him to put his hand or arm through for this purpose. It is immaterial which way the wheel J is turned, either direction putting in the twist in the wires and operating the cutter 7. There is a third pair of guides, 11, in line with those $y\,y$, heretofore described, through or between which the end of the wire is placed; and on the cutter-bar 5 are placed two curved arms, 12, one or the other of which is always in place to support the wire after it is placed in said guides 11. Stationary fingers 13 are placed on top of the concave to keep the loose grain from being forced up out of said concave when it is gathered and pressed up into a gavel. The end of the wire, after each bundle is bound, and when cut off, is drawn and placed in the slot of the twisting-wheel. When the arms $t$ and the wire-carrier $u$ are brought up to deliver the gavel into the concave F, the wire comes up also, and an arm, 14, on the wire-carrier $u$, which is notched for the purpose, presses upon the wire, as shown in Fig. 2, and thus forces that part of it also down into the slot in the twisting-wheel, and when the wheel is rotated the two parts of the wire are twisted around each other, and thus forms the tie.

15 is a weight attached to the shaft $s$ of the pinion H, to aid the operator in raising the gavel. The wheel H has cogs on a portion of its perimeter only, so that it turns just sufficient to place the fingers $t$ in proper position for receiving the gavel, and then raise it up into the concave, where it is bound up. It will be perceived that guides or holders 11 11 are removed a slight distance behind those $y\,y$ far enough for the cutter and its bar to slide between them. Now, the portion of the wire that is between 11 and $y$ also becomes twisted, though it is afterward cut off close up to $y$. The twisted end between the two sets of holders is very important, for when the end is again laid in the slot of the twisting-wheel for the next binding operation, this twisted part or knot, as it were, prevents that end of the wire from being drawn out of the slot by the dropping of the wire-carrier or any strain on the wire itself.

The twisting apparatus and its attachments may be made adjustable on the concave, for the purpose of bringing the apparatus to about the center of the bundle, whether the straw be short or long. The wire-carrier of course must be similarly adjustable, so as to act with the twisting and cutting contrivances.

Having thus fully described the nature and operation of my improved raking and binding apparatus, what I claim therein as new, and desire to secure by Letters Patent, is—

1. The traversing double rake, made to rock in its supports to bring its fingers into and out of action, and automatically fastened and released, substantially in the manner herein described, and for the purposes set forth.

2. In combination with the fingers $t$, for throwing the gathered gavel up into the concave, the arm $u$, for carrying the binding-wire up and over the sheaf, and placing the wire in the slot of the twisting-wheel, substantially as herein described.

3. In combination with the twisting-wheel, the sliding knife for cutting off the wire, substantially as described.

4. In combination with the cutter-bar and its stud, the cam 10, for the purpose of causing the cutter to act regardless of the direction in which the shaft that carries the cam turns, and substantially as described.

5. In combination with the wire-carrier and guides $y$ $y$, a twisting-wheel, made and operated substantially as described.

6. Forming a knot or enlargement on the end of the wire behind where it is cut off by the cutter, by twisting that portion of it, by the means substantially as described, said twist preventing the end from being drawn through the slot of the twisting-wheel, as set forth.

ALLEN SHERWOOD.

Witnesses:
H. A. FLEETWOOD,
C. W. MARKHAM.